United States Patent [19]
Gillett

[11] 3,748,556
[45] July 24, 1973

[54] A.C. MOTOR SPEED CONTROL SYSTEM FOR TWO INDIVIDUAL LIMITING CIRCUITS THEREIN

[75] Inventor: Jimmie Douglas Gillett, Garland, Tex.

[73] Assignee: Electric Machinery Mfg. Company, Minneapolis, Minn.

[22] Filed: Nov. 10, 1971

[21] Appl. No.: 197,403

[52] U.S. Cl.................. 318/227, 318/230, 318/231
[51] Int. Cl. .............................................. H02p 5/40
[58] Field of Search..................... 318/227, 230, 231

[56] References Cited
UNITED STATES PATENTS

| | | | |
|---|---|---|---|
| 3,593,103 | 7/1971 | Chandler | 318/227 X |
| 3,500,158 | 3/1970 | Landau et al. | 318/227 |
| 3,546,551 | 12/1970 | Risberg et al. | 318/227 |
| 3,577,052 | 5/1971 | Bauer | 318/227 |
| 3,584,279 | 6/1971 | Krauthamer | 318/227 |

*Primary Examiner*—Gene Z. Rubinson
*Attorney*—Lawrence I. Lerner et al.

[57] ABSTRACT

An A.C. motor speed control circuit is disclosed in which a three-phase A.C. input signal is converted to a D.C. link voltage by a controlled rectifier bridge and filter. The D.C. link voltage is converted back to a three-phase output voltage, of controllable frequency, by a three-phase switching bridge inverter. The amplitude of the link voltage provided by the controlled rectifier bridge and filter is controlled by a control signal which also sets the frequency of the three-phase output signal provided by the switching bridge inverter. This insures that the amplitude versus frequency characteristic of the three-phase A.C. output is relatively linear. A slow acting current limiting circuit monitors the output current of the switching bridge inverter. A fast acting current limiting circuit monitors the integral of the D.C. link voltage over preselected time intervals to adjust the frequency of operation of the switching bridge if the integral exceeds a threshold value.

15 Claims, 1 Drawing Figure

PATENTED JUL 24 1973
3,748,556
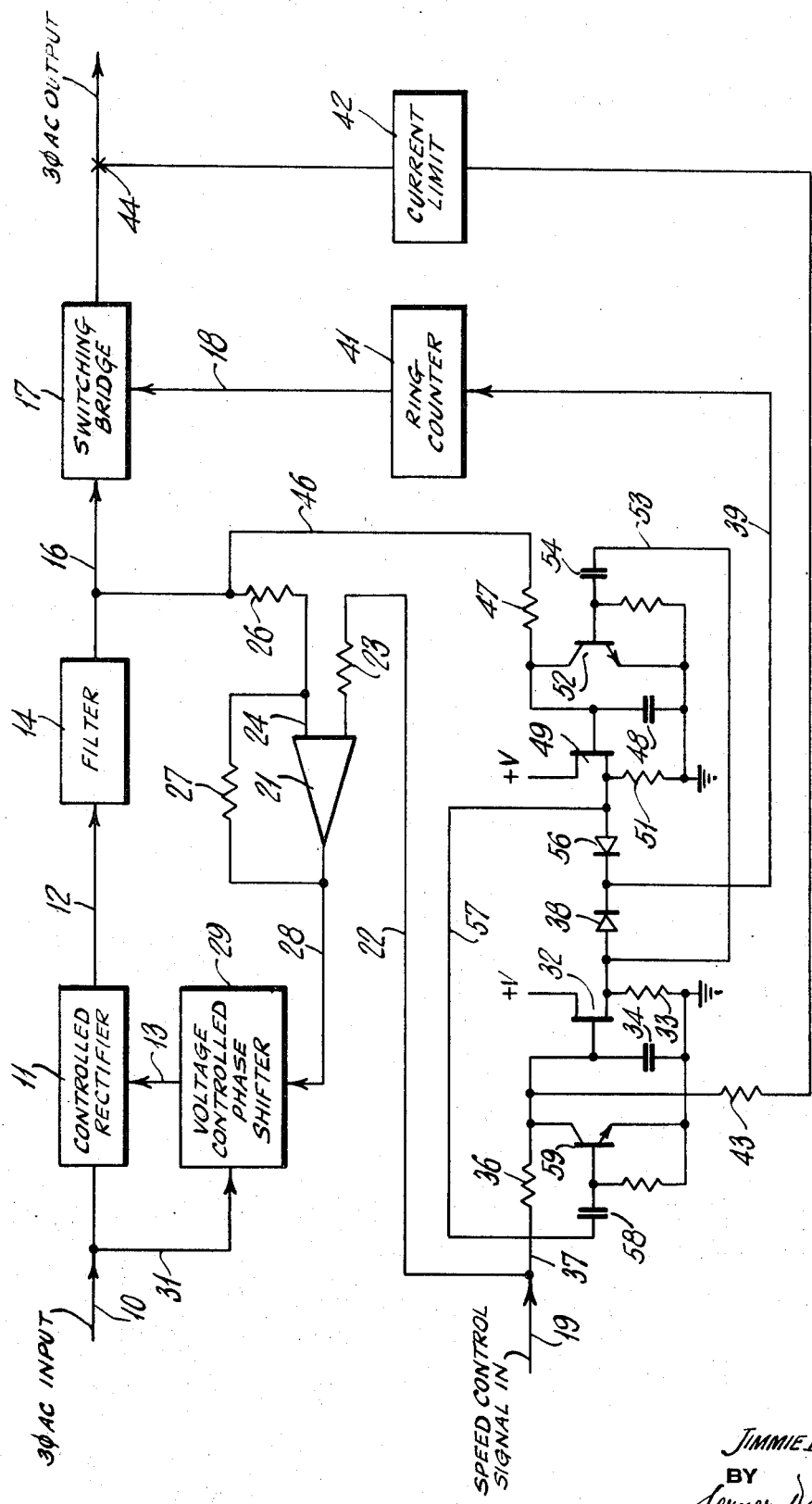
INVENTOR
JIMMIE DOUGLAS GILLETT
BY
Lerner, David & Littenberg
ATTORNEYS

A.C. MOTOR SPEED CONTROL SYSTEM FOR TWO INDIVIDUAL LIMITING CIRCUITS THEREIN

FIELD OF THE INVENTION

This invention relates to A.C. motor speed control circuits and particularly to an A.C. motor speed control circuit of the rectifier-inverter type.

BACKGROUND OF THE INVENTION

A.C. induction motors are employed in many situations because they are rugged, reliable and less expensive than many other types of motors. Since the speed of rotation of an A.C. induction motor is fixed by the physical properties thereof and the frequency of excitation applied thereto, they are used in many applications which require nonadjustable speeds of rotation. These speeds are accomplished by driving the motor from a common 60-cycle power line.

The one area where A.C. induction motors have not been used extensively, heretofore, is where variable speed operation is required. This results from the same characteristic (speed dependency upon frequency) that makes them particularly suitable for stable fixed speed operation.

Because of the other desirable characteristics of A.C. induction motors, circuits have been developed to drive them with a variable frequency source to render them useable as variable speed machines.

It is well known that the torque developed by an A.C. induction motor is dependent upon the flux therein. The flux in turn depends upon the integral of the voltage applied to the motor, with respect to time, over half cycles of operation. This is commonly referred to as the volt-second drive of the motor. Therefore, the amplitude of drive to an A.C. induction motor should increase as a linear function of frequency to maintain the torque or the volt-seconds constant.

The most common way of providing a variable frequency drive to an A.C. induction motor is to employ a three-phase controlled rectifier bridge to convert a three-phase A.C. line voltage to D.C. The D.C. is filtered and reconverted to a three-phase A.C. driving voltage for the motor by an inverter which is typically a three-phase switching bridge.

In U.S. Pat. No. 2,784,365 which issued to R. W. Fenemore et al. on Mar. 5, 1957 and entitled "Thyratron Inverter", a rectifier-inverter drive for an A.C. induction motor is disclosed in which a common control signal is employed for controlling (1) the D.C. level supplied by the rectifier and (2) the frequency of operation of the inverter. The Fenemore patent teaches that this approach insures tracking between the amplitude and frequency of the inverter output thereby maintaining a linear relationship between the voltage and frequency thereof.

It has been found that when systems of the Fenemore type have been employed with A.C. induction motors, the frequency of the inverter can change in response to a control signal faster than the D.C. voltage supplied by the rectifier bridge and filter. This results from the time constant inherent in the filter which is interposed between the rectifier and inverter. When a motor is being started with the Fenemore system, the increase of frequency faster than voltage results in the motor picking up speed quickly with the voltage catching up at a slower rate. This has been found to be acceptable for providing maximum accelerating torque. When a signal is provided, however, to decelerate the motor quickly, it has been found that when the frequency decreases and the voltage does not follow, the motor may saturate and draw excessive current thereby causing a system malfunction.

Another time when the Fenemore system will have problems is when the motor is driving an inertial load and a signal is given to reduce the speed. Here it is not desirable to have the speed reduced too quickly because the most efficient deceleration occurs when the energy in the load is allowed to drive the motor as a generator during deceleration.

Another system for controlling a rectifier-inverter type variable frequency A.C. motor drive to have relative constant volt-second characteristics is disclosed in U.S. Pat. No. Re. 27,040 which issued to R. L. Risberg on Jan. 26, 1971 and entitled "Adjustable Frequency Control System." In the Risberg system, the frequency of the inverter is controlled by a signal derived directly from the D.C. link voltage. As a result, the frequency of the inverter cannot change any faster than the D.C. link voltage so that the excessive currents will not build up in the motor upon attempts at fast deceleration. On the other hand, however, the Risberg system cannot achieve a quick startup of a motor which the Fenemore system provides.

The Risberg system of controlling the frequency of the inverter suffers from the additional drawback in that inductive currents fed back through the inverter to the D.C. link by the load will alter the frequency of the inverter thereby setting up minor oscillation. Risberg has developed an additional system which overcomes this latter-mentioned problem and is disclosed in U.S. Pat. No. 3,546,551 which issued to R. L. Risberg et al. on Dec. 8, 1971 and entitled "Adjustable Frequency Control System Having Feedback for Voltage and Frequency Regulation."

Systems of either the Fenemore or Risberg variety normally have a current-limit circuit included therein which protects the circuitry from catastrophic overload. Such current-limit circuit normally samples the current output of the inverter and operates to adjust either the frequency or amplitude of the system in cases of overload. Normally the current-limit circuit is very slow acting because time constants are built therein to prevent self-oscillation in the overall rectifier-inverter system.

Therefore it is an object of this invention to provide a new and improved variable speed control system for an A.C. induction motor.

It is another object of this invention to provide a variable speed drive for an A.C. induction motor which allows fast acceleration of the motor.

It is still another object of this invention to provide a variable speed drive for an A.C. induction motor which prevents excessive current buildups upon the application of a signal which demands fast deceleration.

It is still another object of this invention to provide a variable speed drive for an A.C. induction motor in which the frequency of signals supplied to the motor is insensitive to currents fed back from the motor.

BRIEF DESCRIPTION OF THE INVENTION

With these and other objects in view the present invention contemplates a system for providing a drive signal to an A.C. induction motor in which the amplitude and frequency of the drive signals are controlled by a speed control signal. The system responds to changes in the speed control signal at a first rate to change the amplitude of a drive signal and at a second rate greater than the first rate to change the frequency of the drive signal. The system includes circuitry responsive to the integral of the amplitude of the drive signal exceeding a predetermined value for increasing the frequency of the drive signal.

In the preferred embodiment the interval over which the integral is taken is less than or equal to the duration of one half cycle of the frequency of the drive signal.

The above invention is particularly adaptable to a system in which the drive signal is generated from a fixed frequency power source and includes a controlled rectifier circuit responsive to the speed control signal for providing a D.C. voltage having an amplitude dependent thereon; a filter circuit responsive to the D.C. voltage for providing a D.C. link voltage; an inverter bridge responsive to the D.C. link voltage and a frequency signal for providing the drive signal; and circuitry for generating the frequency signal in response to the speed control signal.

In the preferred embodiment of the invention, the frequency signal is normally provided by a first resettable relaxation oscillator which provides a first pulse train. A second resettable relaxation oscillator is also provided which is reset by the first pulse train. The frequency of relaxation oscillations of the second resettable relaxation oscillator is determined by the integral of the D.C. link voltage. In normal operation the second resettable relaxation oscillator is reset by the first pulse train before an output signal is provided thereby. If the volt-second relationship of the drive signal falls outside a predetermined range, a pulse is provided by the second resettable relaxation oscillator which preempts the first pulse train to make up a second pulse train which serves as the frequency signal. The pulse provided by the second resettable relaxation oscillator also resets the first resettable relaxation oscillator thereby increasing the frequency of pulses in the frequency signal and maintaining phase coherency therein.

DESCRIPTION OF THE FIGURE

The sole FIGURE is a diagram partially in schematic and partially in block diagram form showing a system embodying the principles of this invention.

DETAILED DESCRIPTION OF THE INVENTION

Referring now to the sole Figure, we see a system embodying the principles of this invention in which a three-phase A.C. voltage from a source (not shown) is applied on input terminals 10 to a controlled rectifier 11. The controlled rectifier 11 converts the A.C. voltage to a D.C. voltage on a lead 12 having an amplitude determined by the phase relationship between pulses applied to a terminal 13 and the A.C. voltage. The A.C. voltage on the lead 12 is passed through a filter 14 to supply a D.C. link voltage on a lead 16. The D.C. link voltage is converted back to a three-phase output voltage by a switching bridge or inverter 17 for driving a motor (not shown). The frequency of the three-phase output voltage is determined by the frequency of pulses applied to a frequency input terminal 18 of the switching bridge 17.

A speed control signal is applied (by a source not shown) to a terminal 19 for controlling both the amplitude of the signals supplied by the controlled rectifier 11 and therefore the D.C. link voltage on the lead 16 and the frequency of operation of the switching bridge 17. This insures that the amplitude of the output voltage provided by the switching bridge 17 varies in a relatively linear manner with the frequency thereof to maintain a constant torque capability in the motor. The speed control signal on the terminal 19 controls the amplitude of the controlled rectifier's output by serving as a reference voltage for an operational amplifier 21. The speed control signal is applied to the operational amplifier 21 by a lead 22 and a resistor 23. The D.C. link voltage on the lead 16 is applied to an inverting input terminal 24 of the operational amplifier 21 by a resistor 26. A feedback resistor 27 is connected from the output of the operational amplifier 21 to the inverting input 24 thereof. In this way, a signal is supplied on a lead 28 which indicates a relationship between the speed control signal on the terminal 19 and the D.C. link voltage on the lead 16.

The signal on the lead 28 is supplied as a phase control signal to a voltage controlled phase shifter 29. The three-phase A.C. voltage on the lead 10 is supplied to the voltage controlled phase shifter 29 by a lead 31. The signal appearing on the input terminal 13 of the controlled rectifier 11 is a signal whose phase is displaced from the signal on the lead 31 by an amount controlled by the signal on a lead 28. Therefore, the amplitude of the signal supplied by the controlled rectifier 11 and, therefore, the voltage on a lead 16 is made to respond to the speed control signal on the terminal 19.

The speed control signal on the terminal 19 controls the frequency of operation of the switching bridge 17 by controlling the operating rate of a relaxation oscillator which includes a unijunction transistor 32, a resistor 33, a capacitor 34 and the resistor 36. A lead 37 supplies the speed control signal on terminal 19 to one end of the resistor 36 which charges the capacitor 34 by the current generated thereby. When the junction of the capacitor 34 and the resistor 36 reaches a value determined by the supply voltage + V, the unijunction transistor 32 breaks down dumping the energy stored in the capacitor 34 creating a pulse across the resistor 33. The unijunction transistor 32 then restores itself to its off condition with the voltage across the capacitor 34 in its initial condition to begin the recharging cycle anew.

The pulse provided across the resistor 33 is transmitted by a diode 38 and a lead 39 to a ring counter 41 which drives the switching bridge 17 via the lead 18. Since the system provides a three-phase output, the bridge 17 is a three-phase switching bridge and therefore the pulses provided on the lead 39 are divided down by the ring counter 41 to provide pulses with proper timing and proper sequence to generate the three-phase output for application to the motor (not shown).

If a load is applied to the output of the switching bridge 17 which draws excessive current therefrom over a period of time which would cause damage to the switching bridge 17, a conventional current limit circuit bleeds current from the capacitor 34 through a resistor 43 to decrease the frequency of pulses provided by the unijunction transistor 32 to the ring counter 41. (The current limit circuit 42 for example, could be a threshold sensing device.) Under most circumstances the decrease of frequency of operation of the switching bridge 17 will reduce the current drawn therefrom for a legitimate current overload. If one desires, the current limit circuit 42 can be connected to reduce the voltage supplied by the control rectifier 11 which ultimately would reduce the D.C. link voltage. However, the time constants built into the filter 14 are such that the time of operation of such a loop could be too long to protect the switching bridge 17. It should be noted that the current limit circuit 42 senses the output current of the switching bridge 17 from a current transformer 44.

In accordance with the teachings of this invention, the frequency of the pulses applied to the ring counter 41 is increased if the volt-second integral supplied by the switching bridge 17 to the motor (not shown) exceeds a predetermined level. To this end the voltage on the lead 16 is applied by a lead 46 to a resistor 47 which supplies a current proportional thereto to a capacitor 48. The capacitor 48 is connected to a unijunction transistor 49 and a resistor 51 as the capacitor 34 is connected to the unijunction transistor 32 and the resistor 33.

A transistor 52 is connected across the capacitor 48. The output of the unijunction transistor 32 is applied to the base of the transistor 52 by a lead 53 and a capacitor 54. Therefore, the transistor 52 discharges the capacitor 48 each time a pulse is supplied by the unijunction transistor 32. The voltage across the capacitor 48 increases at a rate dependent upon the voltage supplied by the lead 46 to the capacitor 47. If the voltage across the capacitor 48 reaches a value sufficient to break down the unijunction transistor 49 before it is again discharged by a pulse supplied from the unijunction transistor 32, the unijunction transistor 49 provides a pulse across the resistor 51 which is transmitted by the diode 56 to the lead 39 for application to the ring counter 41. The pulse from the unijunction transistor 49 is also supplied by a lead 57 and a capacitor 58 to turn on a transistor 59 for resetting the capacitor 34.

In this way it is seen that the voltage on the lead 16 is integrated on the capacitor 48. If that integral exceeds a predetermined value prior to reset by unijunction transistor 32, the frequency on the lead 39 and therefore supplied to the ring counter 41 is increased. It is also seen that the unijunction transistor 32 is reset to maintain phase coherency of the signal on the lead 39. It should be noted that the interval between pulses supplied by the unijunction transistor 32 is less than one half cycle of the frequency of the switching bridge 17. It is however, of the same order of magnitude and may be conveniently used.

It should be understood that although the invention has been disclosed with respect to a particular embodiment thereof, numerous others will become obvious to those of ordinary skill in the art in light thereof.

What is claimed is:

1. A system for providing a drive signal to an AC induction motor in which the amplitude and frequency of said drive signal are controlled by a speed control signal; said system including:
    a circuit responsive to said speed control signal for providing a DC voltage having an amplitude dependent upon said speed control signal;
    an inverter bridge responsive to said DC voltage and a frequency signal for providing said drive signal; and
    means responsive to said control signal for providing said frequency signal; said system being characterized by:
    means responsive to the integral of said amplitude of said drive signal exceeding a predetermined value over an interval determined by said frequency of said drive signal for increasing said frequency of said drive signal.

2. The system as defined in claim 1 in which said interval has a duration which is less than or equal to one half cycle of said frequency of said drive signal.

3. The system as defined in claim 1, in which said frequency signal is normally provided by a first resettable relaxation oscillator responsive to said control signal for providing a first pulse train having a first repetition rate related thereto.

4. A system for providing a drive signal to an AC induction motor in which the amplitude and frequency of said drive signal are controlled by a speed control signal; said system responding to charges in said speed control signal at a first rate to change said amplitude of said drive signal and at a second rate to change said frequency of said drive signal, said second rate being faster than said first rate; said system being characterized by:
    means responsive to the integral of said amplitude of said drive signal exceeding a predetermined value over an interval determined by said frequency of said drive signal for increasing said frequency of said drive signal;
    said drive signal is generated from a fixed frequency power source and includes:
    a conrolled rectifier circuit responsive to said speed control signal for providing a DC voltage having an amplitude dependent upon said speed control signal;
    a filter circuit responsive to said DC voltage for providing a DC link voltage;
    an inverter bridge responsive to said DC link voltage and a frequency signal for providing said drive signal;
    means responsive to said control signal for providing said frequency signal;
    said frequency signal is normally provided by a first resettable relaxation oscillator responsive to said control signal for providing a first pulse train having a first repetition rate related thereto;
    said frequency increasing means includes a second resettable relaxation oscillator reset by said first pulse train, responsive to said DC link voltage for providing a pulse time period after being reset if not reset again by said first pulse train; and said time period being determined by said DC link voltage.

5. The system as defined in claim 4 in which said resettable relaxation oscillator resets said first resettable relaxation oscillator.

6. The system as defined in claim 5 in which said pulse from said second resettable relaxation oscillator is combined with said first pulse train to provide said frequency signal.

7. The system as defined in claim 6 also including:
    means responsive to the current output of said system exceeding a threshold valve for limiting said current output.

8. The system as defined in claim 7 in which said current output is limited by decreasing said frequency signal.

9. The system as defined in claim 8 in which said frequency signal is decreased by bleeding current from said first resettable relaxation oscillator.

10. The system as defined in claim 3 in which said frequency increasing means includes a second resettable relaxation oscillator reset by said first pulse train, responsive to said DC link voltage for providing a pulse time period after being reset if not reset again by said first pulse train; said time period being determined by said DC link voltage.

11. The system as defined in claim 10 in which said second resettable relaxation oscillator resets said first resettable relaxation oscillator.

12. The system as defined in claim 11 in which said pulse from said second resettable relaxation oscillator is combined with said first pulse train to provide said frequency signal.

13. The system as defined in claim 12 also including:
means responsive to the current output of said system exceeding a threshold value for limiting said current output.

14. The system as defined in claim 13 in which said current output is limited by decreasing said frequency signal.

15. The system as defined in claim 14 in which said frequency signal is decreased by bleeding current from said first resettable relaxation oscillator.

* * * * *